March 10, 1953 W. H. CLINGMAN 2,631,077

RADIO PHONOGRAPH COMBINATION RECEIVER CABINET CONSTRUCTION

Filed Sept. 13, 1949 2 SHEETS—SHEET 1

Inventor:
William H. Clingman
By: Allen D. Redfield
Attorney.

March 10, 1953 W. H. CLINGMAN 2,631,077

RADIO PHONOGRAPH COMBINATION RECEIVER CABINET CONSTRUCTION

Filed Sept. 13, 1949 2 SHEETS—SHEET 2

INVENTOR.
WILLIAM H. CLINGMAN.
BY
Alden D. Redfield.
ATTORNEY.

Patented Mar. 10, 1953 2,631,077

UNITED STATES PATENT OFFICE 2,631,077

RADIO-PHONOGRAPH COMBINATION RECEIVER CABINET CONSTRUCTION

William H. Clingman, Grand Rapids, Mich., assignor to Avco Manufacturing Corporation, Cincinnati, Ohio, a corporation of Delaware Application September 13, 1949, Serial No. 115,372

4 Claims. (Cl. 312—8)

The present invention relates to a novel cabinet for a phonograph combination which combines a phonograph with a radio receiver or television set.

Heretofore, a considerable number of phonograph combination receivers have been sold which generally have combined a record changer phonograph mechanism with a radio receiver. Such arrangements generally have been housed in cabinets having a plurality of compartments. Generally one compartment has housed the radio receiver, another the automatic record changer, and still another the loud speaker. A few cabinet designs in the past have provided another compartment for the storage of phonograph records.

In practically all of the previous designs of cabinets for so-called phonograph combinations there have been numerous disadvantages. It, of course, is known that cabinet resonance plays an important part in the reproduction of the higher quality radio receivers and phonographs. It is of course possible to modify the cabinet design to some extent and to compensate by suitable circuit arrangements for said resonance characteristics. Generally, the various compartments have been provided with doors so that the cabinet would have a pleasing appearance when certain components housed in the various compartments were not in use. In the case of the compartments housing the receiver or even the automatic record changer, it has been found satisfactory to hinge the doors since they are used rather infrequently, or the operation normally performed is such that the doors are not subject to accidental shock. In the instance of doors for the record compartment or where a door partially or completely closes the loud speaker compartment, it is not uncommon to have such doors subjected to shock by persons bumping against the doors with the result that the hinges break or loosen. In the case of the doors for compartments such as the loud speaker compartment and the record compartment, it furthermore has been found that such doors are often moved to such position that they change the mechanical impedance of the loud speaker. This, of course, changes the reproduction characteristic, and in the higher quality, high fidelity systems this is believed to be a distinct disadvantage.

Accordingly, in accordance with the present invention, it is proposed to provide an improved cabinet construction for phonograph combination receivers which will obviate the disadvantages of the arrangements of the prior art and which will insure a substantially constant mechanical impedance for the normal operation of the loud speaker. In the present embodiment, it is proposed to provide a sliding frame which serves as a grille cover for the loud speaker compartment and also serves as a closure or covering member for the record storage compartment. Such an arrangement is constructed without the use of hinges or members which are subject to breakage. Furthermore, the construction is such that normal operation on the part of the user will preclude leaving the cabinet components in such position as to be subject to unnecessary strain and shock.

It therefore is an object of the present invention to provide an improved cabinet construction for a phonograph combination receiver.

A still further object of the present invention is to provide a phonograph combination receiver cabinet having a single closure member for the loud speaker and record storage compartments which will not change substantially the mechanical impedance presented to the loud speaker, irrespective of the position of the closure member relative to the compartments.

Other and further objects of the present invention subsequently will become apparent by reference to the following description taken in conjunction with the accompanying drawings wherein.

Figure 1:
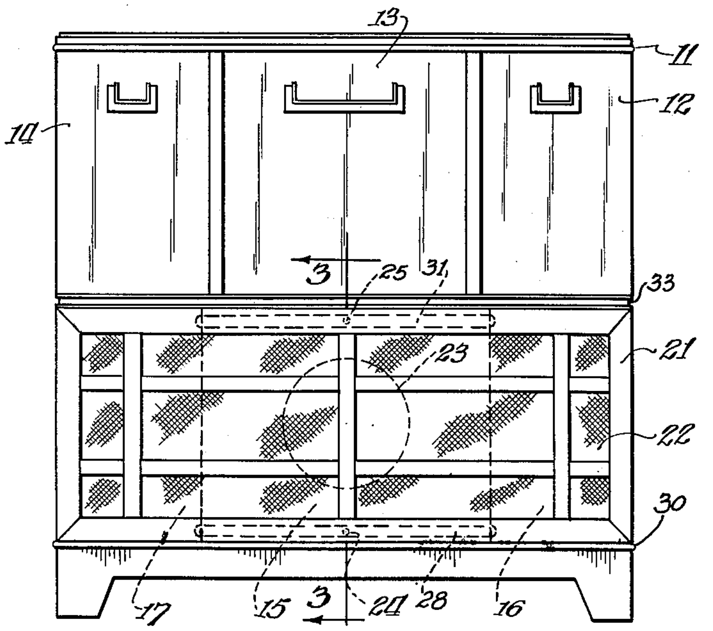
Fig. 1 is a front view of a cabinet constructed in accordance with the principles of the present invention.

Referring to the drawings it will be seen that there has been provided a cabinet for a phonograph combined with a receiver which may be for FM, AM or television. Such cabinet 11 is provided with a plurality of compartments 12, 13 and 14 located near the top for receiving the automatic record changer mechanism and the appropriate receiver chassis. At the bottom the cabinet is provided with a loud speaker compartment 15 and one or more record storage compartments 16 and 17. Extending across the front of these various compartments is a pair of tracks 18 and 19 for supporting and guiding a frame 21. The frame 21 has its back side covered with grille cloth 22 so that the cloth normally hides the loud speaker compartment and the record storage compartments when in the position shown in Fig. 1.

Figure 2:
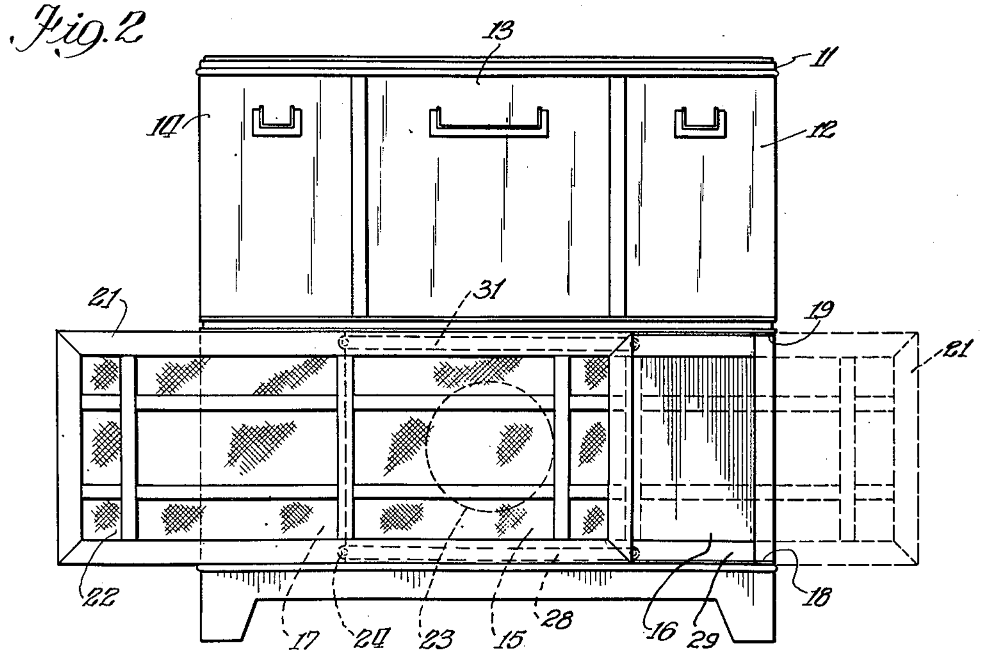
Fig. 2 is another front view of the cabinet shown in Fig. 1 and illustrating the manner in which the closure frame is operated.
Figure 3:
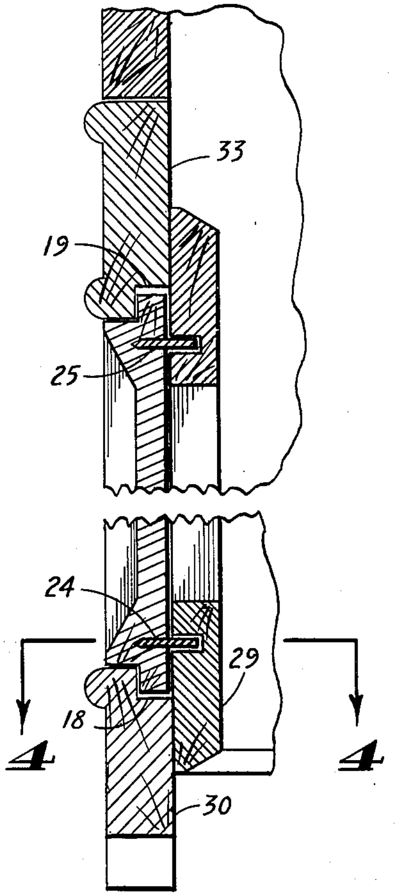
Fig. 3 is a fragmentary elevational sectional view taken along the line 3—3 of Fig. 1 and looking in the direction of the arrows.
Figure 4:
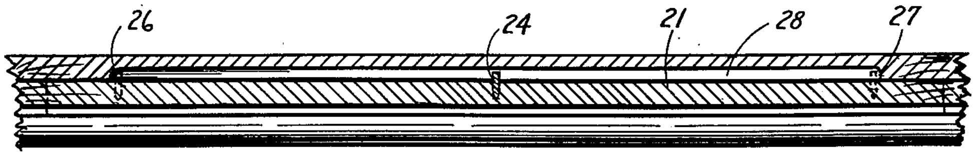
Fig. 4 is a fragmentary sectional view of the details of the lower stop member and terminal abutments, taken along the line 4—4 of Fig. 3, looking in the direction of the arrows.

It will be noted from the solid and dotted line representations shown in Fig. 2 that where two record storage compartments 16 and 17 are provided the frame 21 may be moved a predetermined distance to the right or left. The distance which the frame 21 may be moved is predetermined by a plurality of pins or stop members 24, 25, each of which engages suitable cooperating terminal abutments or stops. The details of the stop members and abutments are subject to wide variation and are not considered to be a matter involving invention. In the specific example herein shown, the stop members 24, 25 are secured centrally on the sliding frame and project from the rear thereof. Lower stop member 24 projects for sliding movement, limited by terminal abutments 26 and 27, into a lower groove 28 formed on a cabinet member 29 secured to front molding 30. Upper stop member 25 similarly projects into an upper groove 31, as best shown in Fig. 3. The frame 21 is slidably mounted between tracks 18 and 19 formed in cabinet members 30 and 33, respectively. In Fig. 4 the stop member 24 is graphically shown in full lines, and the limiting positions which it may take are shown in dashed outlines. It furthermore will become apparent from the representation shown in Fig. 2 that the loud speaker opening 23, as represented by the dotted circle in a baffle board, has practically the same exposure irrespective of the position of the frame 21, whether this frame is in the closed position of Fig. 1, at the extreme positions illustrated in Fig. 2, or at intermediate positions. It thus becomes apparent that the mechanical impedance presented to the loud speaker 23 is substantially constant at all times and hence there is no change in the quality of reproduction due to a change in the mechanical impedance.

While a particular design has been shown for the frame 21 it of course becomes apparent that other designs might be employed provided that such designs are not such as to block the loud speaker opening 23 to a greater or lesser degree dependent upon the position of the frame 21 relative to the cabinet 11. By providing a grille cloth covering 22 for the entire frame it is possible to minimize the probable mechanical impedance change.

While for the purpose of illustrating and describing the present invention a certain cabinet design has been shown, it is to be understood that the invention is not to be limited thereby, since such other designs for cabinets may employ the principles of the present invention as may suit the fancy of the designer. It therefore is to be understood that the invention is to be limited only by the spirit and scope of the invention as set forth in the accompanying claims.

What I desire to protect by U. S. Letters Patent is claimed as follows:

1. A cabinet for a phonograph receiver combination having a loud speaker compartment adjacent the bottom thereof, a record storage compartment located adjacent the side thereof, a set of tracks extending across the front of said compartments, a single quadrangular frame normally extending completely across both of said compartments and mounted for lateral movement on said tracks, means comprising at least one stop member mounted centrally on the frame and terminal abutments on the cabinet for limiting the movement of said frame to expose for access said record storage compartment, and a cover for said frame on the side normally adjacent both of said compartments to permit sound to emanate from the loud speaker compartment without substantial change in the mechanical impedance presented to the loud speaker irrespective of the position of said frame, the length of the cover and frame being such that the cover is in front of the speaker compartment at all times.

2. A cabinet for a phonograph receiver combination comprising a loud speaker compartment, a record storage compartment located adjacent the side thereof, a single quadrangular frame normally extending completely over both of said compartments, means for sliding said frame laterally a distance sufficient to expose and give access to the record storage compartment, and a grille cloth covering for said frame to permit sound to emanate from the loud speaker compartment without substantial mechanical impedance change, irrespective of the position of said frame, the length of the cover and frame being such that the cover is in front of the speaker compartment at all times.

3. A cabinet for a phonograph receiver combination having a central loud speaker compartment, a record storage compartment located adjacent each side thereof, a single quadrangular frame normally extending completely over all of said compartments, means for sliding said frame laterally to the right or left a distance sufficient to give access to a selected record storage compartment, and a grille cloth covering for said frame normally adjacent both of said compartments to permit sound to emanate from the loud speaker without substantial mechanical impedance change irrespective of the position of said frame, the length of the cover and frame being such that the cover is in front of the speaker compartment at all times.

4. A cabinet for a phonograph receiver combination having a loud speaker compartment located adjacent the bottom of said cabinet, record storage compartments located on either side of said loud speaker compartment, a single generally open quadrangular frame normally extending completely over all of said compartments, a plurality of tracks for supporting said frame in sliding relation whereby the frame may be moved laterally to the right or left of its normal position to provide access to a selected record storage compartment, means comprising at least one stop member mounted centrally on the frame and terminal abutments on the cabinet for limiting the distance of travel of said frame, and a grille cloth covering for such frame normally adjacent all of said compartments whereby a substantially constant mechanical impedance is presented to the loud speaker, irrespective of the position of said frame, the length of the cover and frame being such that the cover is in front of the speaker compartment at all times.

WILLIAM H. CLINGMAN.

REFERENCES CITED

The following references are of record in the file of this patent:

UNITED STATES PATENTS

| Number | Name | Date |
|---|---|---|
| 1,620,352 | Holtzman | Mar. 8, 1927 |
| 1,685,050 | Gerns | Sept. 18, 1928 |
| 2,553,965 | Gist | May 22, 1951 |

FOREIGN PATENTS

| Number | Country | Date |
|---|---|---|
| 487,125 | Great Britain | June 15, 1938 |